US012718787B2

(12) United States Patent
Lim

(10) Patent No.: US 12,718,787 B2
(45) Date of Patent: Aug. 25, 2026

(54) APPARATUS AND METHOD FOR ACTIVE NOISE CONTROL USING REAL-TIME VARIABLE COHERENCE

(71) Applicant: HYUNDAI MOBIS CO., LTD., Seoul (KR)

(72) Inventor: Hyung Sub Lim, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 154 days.

(21) Appl. No.: 18/667,574

(22) Filed: May 17, 2024

(65) Prior Publication Data

US 2025/0069576 A1 Feb. 27, 2025

(30) Foreign Application Priority Data

Aug. 22, 2023 (KR) ........................ 10-2023-0109665

(51) Int. Cl.
*G10K 11/178* (2006.01)

(52) U.S. Cl.
CPC .... *G10K 11/1781* (2018.01); *G10K 2210/128* (2013.01)

(58) Field of Classification Search
CPC ..... G10K 11/17881; G10K 2210/3018; G10K 2210/128; G10K 2210/12821; G10K 2210/1282; G10K 11/17823; G10K 11/17883
See application file for complete search history.

(56) References Cited

U.S. PATENT DOCUMENTS

2023/0252967 A1* 8/2023 Feng ................ G10K 11/17854
381/71.4

* cited by examiner

*Primary Examiner* — Kile O Blair
(74) *Attorney, Agent, or Firm* — Morgan Lewis & Bockius LLP

(57) ABSTRACT

An active noise control method includes receiving noise information from a microphone sensor, receiving acceleration information from an acceleration sensor, calculating real-time variable coherence by comparing the received noise information with the received acceleration information, resetting input data of an active noise control region according to the calculated coherence information, generating an active noise control signal based on the reset input data, and outputting the generated active noise control signal.

6 Claims, 8 Drawing Sheets

APPARATUS AND METHOD FOR ACTIVE NOISE CONTROL USING REAL-TIME VARIABLE COHERENCE

Pursuant to 35 U.S.C. § 119(a), this application claims the benefit of earlier filing dates and right of priority to Korean Application No. 10-2023-0109665, filed on Aug. 22, 2023, the contents of which are hereby incorporated by reference herein in their entirety.

BACKGROUND OF THE DISCLOSURE

Field of the Disclosure

Embodiments are applicable to vehicles in all fields, and more particularly, for example, may be applied to vehicle systems including an active noise control system.

Discussion of the Related Art

Noise refers to loud sounds that make human emotions unpleasant, expressed in decibels (dB), and is largely divided into indoor noise generated by vehicle parts and external noise generated outside the vehicle.

Vibration refers to a vibration phenomenon in which a vehicle body shakes at a certain period, and is caused by repeated movement of kinetic energy and potential energy. Vibration may largely include internal vibration caused by an operation of internal parts such as an engine, and external vibration transmitted to the vehicle through a vehicle body, tires, and suspension from friction with the road surface, wind, etc.

An active noise control system in conventional vehicles has similar amplitude to that of road noise due to attempt to cancel noise but often nullifies this noise by emitting sound waves with an inverted phase. The effectiveness of such active noise cancellation often depends upon coherence between reference and feedback signals.

However, the conventional active noise control system has a problem in that the performance of active noise control is adversely affected because the same coherence pair is always applied and fixed coherence is applied during calculation of coherence rather than failing to apply coherence depending on the situation.

SUMMARY OF THE DISCLOSURE

To achieve the aforementioned problem, an embodiment of the present disclosure provides a method of and apparatus for active noise control for improving the performance of active noise control by using real-time variable coherence.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an embodiment of the present disclosure, an active noise control method includes receiving noise information from a microphone sensor, receiving acceleration information from an acceleration sensor, calculating real-time variable coherence by comparing the received noise information with the received acceleration information, resetting input data of an active noise control region according to the calculated coherence information, generating an active noise control signal based on the reset input data, and outputting the generated active noise control signal.

The calculating of real-time variable coherence by comparing the received noise information with the received acceleration information may include creating a coherence pair by using axes of all acceleration sensors for all microphone sensors installed in a vehicle, and calculating, as a coherence value, a correlation between noise information and acceleration information corresponding to the coherence pair.

The resetting of input data of an active noise control region according to the calculated coherence information may include determining an axis of an acceleration sensor with a highest correlation based on the calculated coherence value, and selecting the axis of the determined acceleration sensor as active noise control input data.

The determining of an axis of an acceleration sensor with a highest correlation may include determining an axis of an acceleration sensor corresponding to a coherence value having a highest value in a certain frequency domain per unit time from among the calculated coherence values.

The selecting of the axis of the determined acceleration sensor as active noise control input data may include selecting an acceleration sensor and an axis having a preset optimal coherence corresponding to a road on which the vehicle drives.

DETAILED DESCRIPTION OF THE DISCLOSURE

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
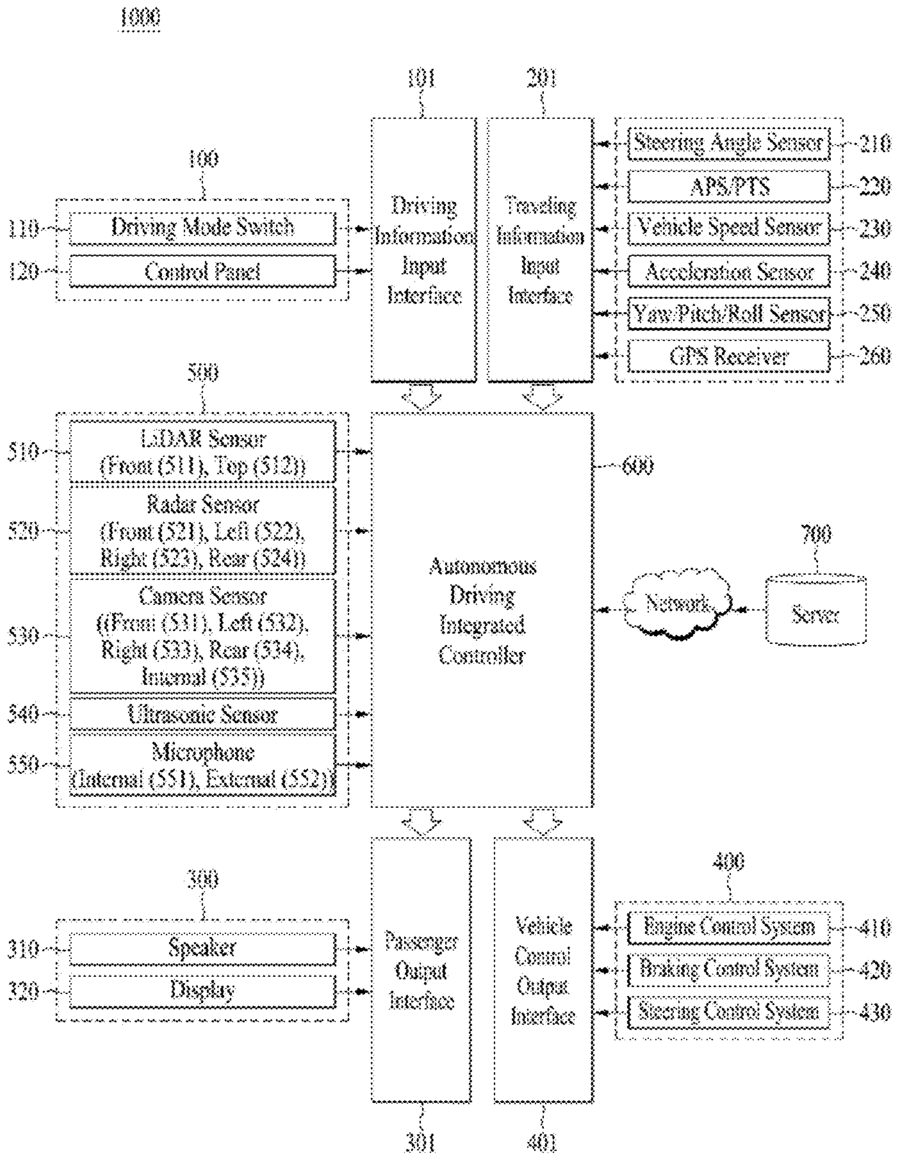
FIG. 1 is an overall block diagram of an autonomous driving control system to which an autonomous driving device is applicable, according to any one of embodiments of the present disclosure.
Figure 2:
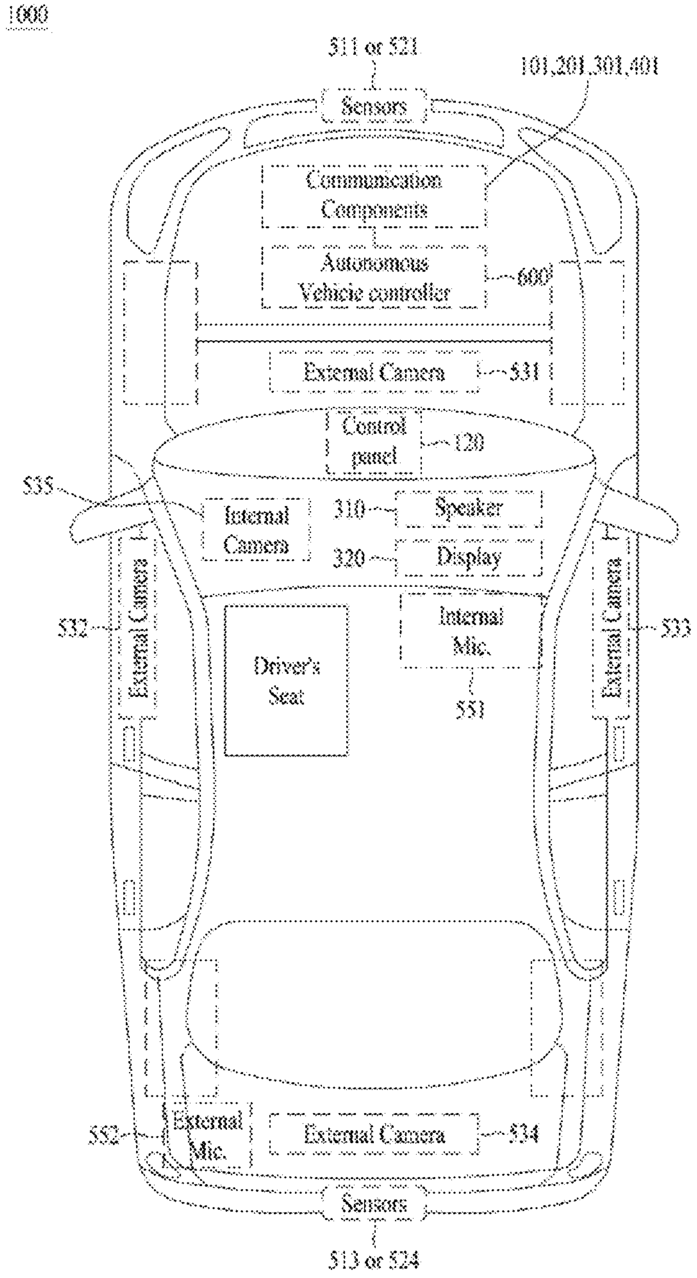
FIG. 2 is a diagram of an example in which an autonomous driving device is applied to an autonomous driving vehicle, according to any one of embodiments of the present disclosure.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw; a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530) may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540) in addition to the LiDAR sensor 510, the radar sensor 520, and the camera sensor 530) and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
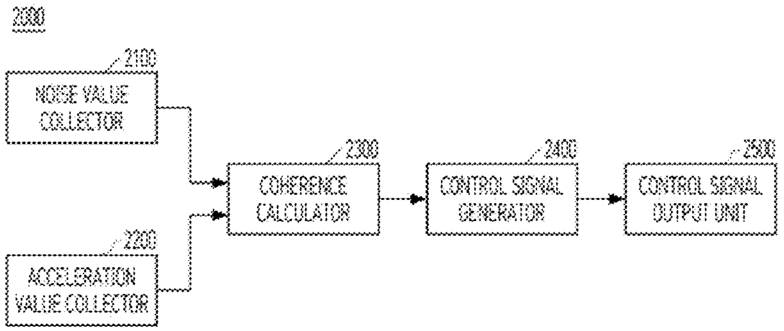
FIGS. 3 and 4 are diagrams for explaining an active noise control apparatus according to an embodiment of the present disclosure.
Figure 4:
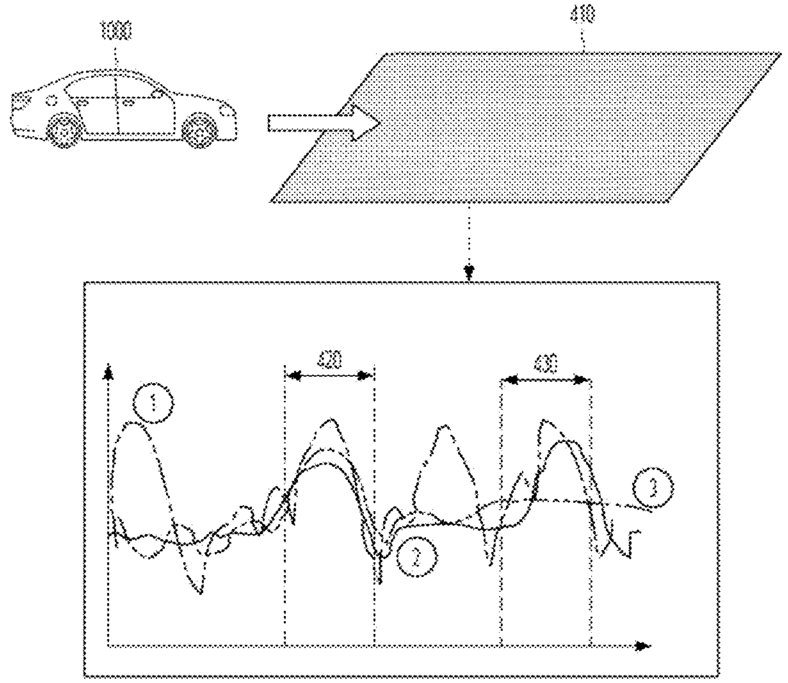

FIGS. 3 and 4 are diagrams for explaining an active noise control apparatus according to an embodiment of the present disclosure.

Referring to FIGS. 3 to 4, an active noise control apparatus 2000 using real-time variable coherence may include a noise value collector 2100, an acceleration value collector 2200, a coherence calculator 2300, a control signal generator 2400, and a control signal output unit 2500.

The noise value collector 2100 may collect noise information through a microphone sensor in a vehicle.

The acceleration value collector 2200 may collect acceleration information through an acceleration sensor in the vehicle. The acceleration information may include X-axis acceleration information, Y-axis acceleration information, and Z-axis acceleration information.

The coherence calculator 2300 may calculate real-time variable coherence based on noise information and acceleration information.

Coherence may represent a correlation between a signal generated from an actual sensor and noise to be measured in the vehicle. At this time, the signal and noise from the sensor may not always match.

The coherence may be a value that implements correlation calculation in the frequency domain. In this case, the correlation may be a method of representing a correlation of signals in the time domain. The coherence may be calculated according to Equation 1 below.

$$C_{xy} = \frac{S_{xy}(f)}{\sqrt{S_{xx}(f)}\sqrt{S_{yy}(f)}} \quad \text{Equation 1}$$

Here, Sxx and Syy may be a standard deviation by frequency (power spectral density (PSD)) of an X signal and a Y signal, Sxy may be a covariance by frequency (cross spectral density (CSD)) of the X and Y signals, and a covariance may be a value expressing the correlation between two random variables in terms of direction and magnitude.

Therefore, in some embodiments, coherence may have a value of −1 to 1. As the coherence is close to 1, a correlation between two signals may increase in a forward direction, as the coherence is close to −1, the correlation between the two signals may increase in a reverse direction, and as the correlation between the two signals is close to 0, the correlation between the two signals may have an insufficient value.

The coherence calculator 2300 may create a coherence pair by using axes of all acceleration sensors for all microphone sensors installed in the vehicle.

The coherence calculator 2300 may calculate, as a coherence value, the correlation between noise information and acceleration information corresponding to the coherence pair.

The control signal generator 2400 may reset input data of an active noise control area according to the calculated coherence information.

The control signal generator 240 may determine the axis of an acceleration sensor with the highest correlation based on the calculated coherence value.

The control signal generator 2400 may select the axis of the determined acceleration sensor as active noise control input data.

The control signal generator 2400 may generate an active noise control signal based on the reset input data.

The control signal output unit 2500 may output the generated active noise control signal.

FIG. 4 is a diagram for explaining calculation of real-time variable coherence, according to an embodiment of the present disclosure.

Referring to FIG. 4, the coherence when a vehicle 1000 drives on a road 410 may be calculated.

Plots #1, #2, and #3 may correspond to the frequency domain, plot #1 may be noise information received by a sensor of a microphone #1 610, plot #2 may be acceleration information received from the X-axis of a first acceleration sensor, and plot #3 may be acceleration information received from the Y-axis of the first acceleration sensor.

It may be seen that the similarity of sensors in plots #1, #2, and #3 matches in a bandwidth corresponding to a first section 420, and the similarity of plots #1 and #2 matches in a bandwidth corresponding to a second section 430.

In this case, in the bandwidth of the first section 420, the coherence in plots #1, #2, and #3 may have a high value, and in the bandwidth of the second section 430, the coherence in plots #1 and #2 may have a high value. Overall, it may be seen that the coherence in plots #1 and #2 is high.

As such, coherence pairs may be created and compared using the axes of all acceleration sensors for all microphones in the vehicle.

Figure 5:
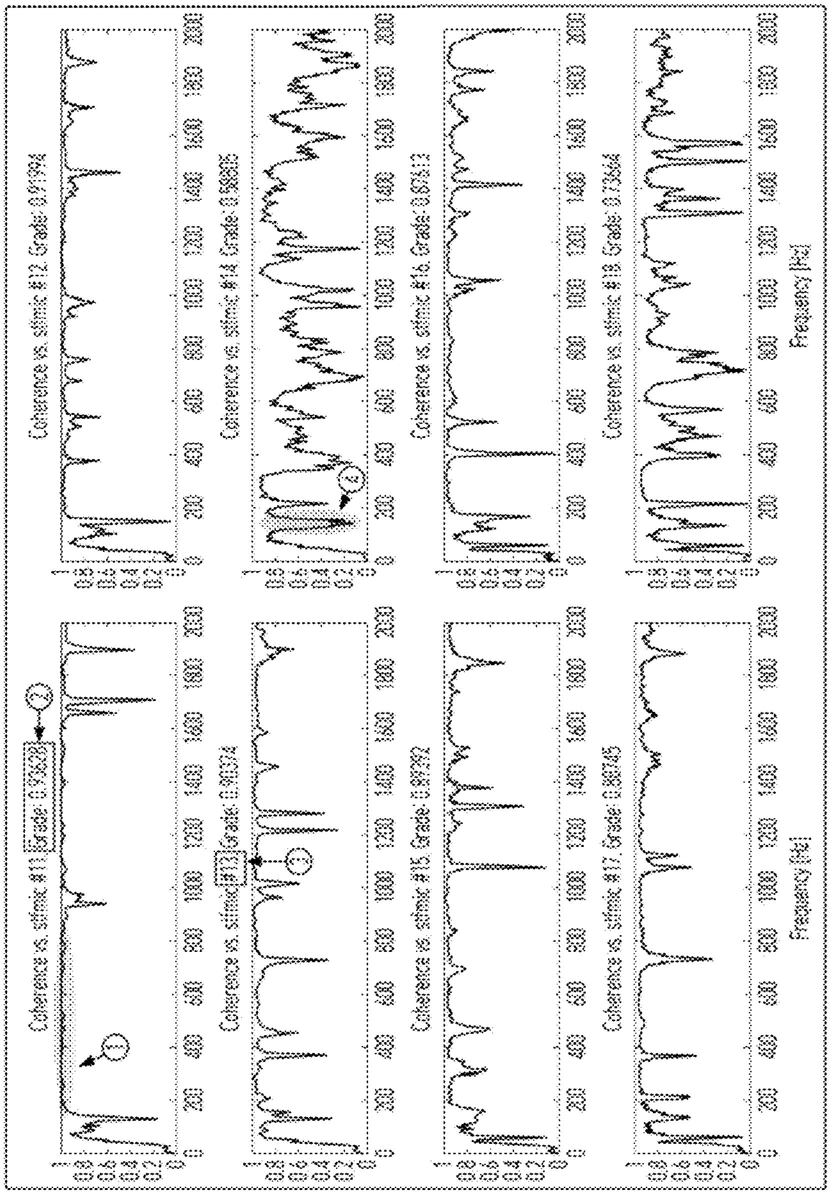
FIGS. 5 and 6 are diagrams for explaining coherence in active noise control, according to an embodiment of the present disclosure.
Figure 6:
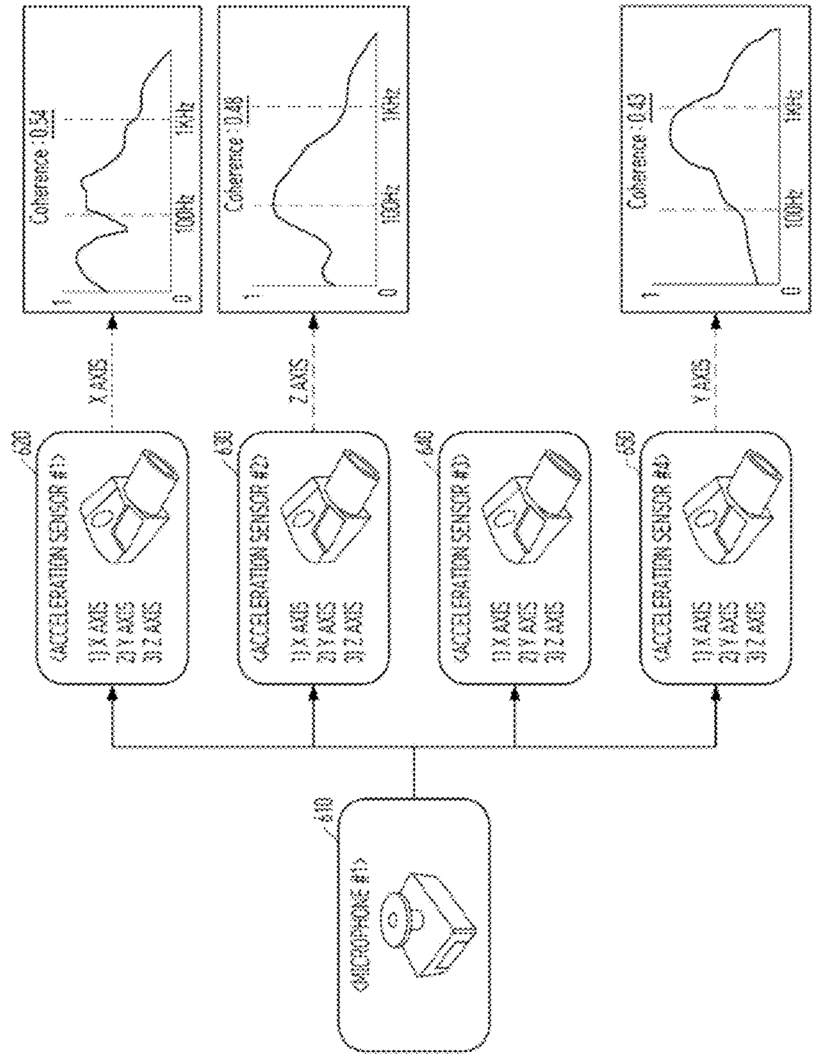

FIGS. 5 and 6 are diagrams for explaining coherence in active noise control, according to an embodiment of the present disclosure.

In active noise control, two sensor values may be used. Road noise may be determined by collecting noise with a microphone sensor, measuring an acceleration value with an acceleration sensor, and analyzing a correlation between the two signals.

At this time, noise transferred to a microphone is data mixed with all kinds of noise, but an acceleration sensor value has a very deep correlation with road noise, and thus coherence may be compared when using the microphone and the acceleration sensor data. In other words, a correlation between a vibration value and noise generated from road noise may be checked.

Referring to FIG. 5, as seen from the table of coherence analysis results used in actual active noise control, as a coherence value is close to 1, the similarity between the microphone and the acceleration sensor may increase, and as the coherence value is close to 0, actual noise and a measured value of each sensor may not match, and thus a correlation therebetween may be insufficient.

Referring to FIG. 6, in active noise control, the coherence for each sensor may be calculated and a value with the highest correlation may be selected and used.

In some embodiments, a total of 12 coherence pairs may be derived from the microphone #1 610 and four acceleration sensors 620, 630, 640, and 650 of a vehicle.

In other words, three coherence pairs may be derived based on the microphone #1 610 and the X-axis, Y-axis, and Z-axis values of an acceleration sensor #1 620, three coherence pairs may be derived based on the microphone #1 610 and the X-axis, Y-axis, and Z-axis values of an acceleration sensor #2 630, three coherence pairs may be derived based on the microphone #1 610 and the X-axis, Y-axis, and Z-axis values of an acceleration sensor #3 640, and three coherence pairs may be derived based on the microphone #1 610 and the X-axis, Y-axis, and Z-axis values of an acceleration sensor #4 650. Thus, 12 coherence pairs may be derived according to one microphone and four acceleration sensors.

Then, from the 12 coherence pairs, 3 pairs with the highest coherence in a frequency band (100 Hz to 1 kHz)

may be selected. At this time, a value of the coherence pair along the X axis of the acceleration sensor #1 620 may be 0.54, a value of the coherence pair along the Z axis of the acceleration sensor #2 630 may be 0.48, and a value of the coherence pair along the Y axis of the acceleration sensor #4 650 may be 0.43.

Figure 7:
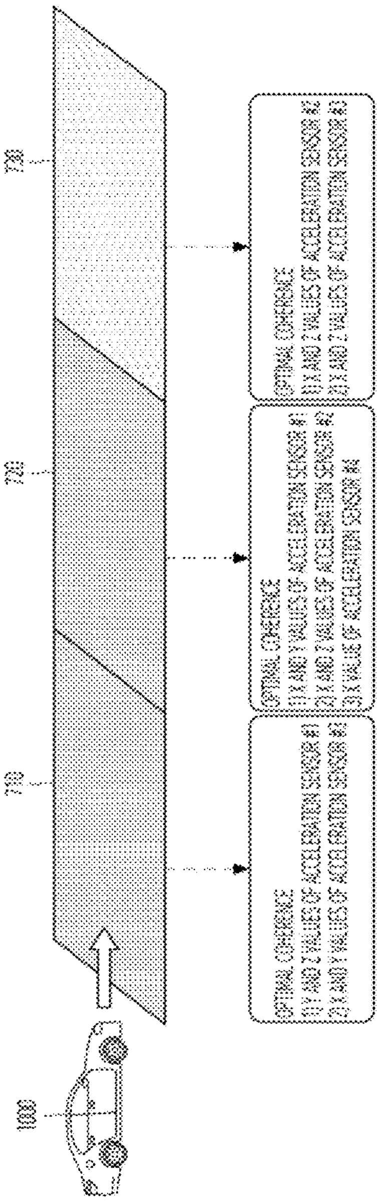
FIG. 7 is a diagram for explaining coherence in active noise control, according to an embodiment of the present disclosure.

FIG. 7 is a diagram for explaining coherence in active noise control, according to an embodiment of the present disclosure.

Referring to FIG. 7, the drawing shows a case in which a vehicle sequentially drives on a first road 710, a second road 720, and a third road 730, which have different textures. Roads may be classified into various types. Depending on a material, the roads may be classified into asphalt, cement, and dirt roads, depending on a condition, the roads may be classified into rain or snow roads, and depending on a construction environment, the roads may be classified into an old (noisy) road or a quiet road when driving. In addition to the examples, there may be various types of roads.

Each road may cause a different driving environment and noise, and thus a situation of each road is different, and there may be separate coherence for each sensor suitable for each situation.

Assuming that four acceleration sensors of a vehicle are attached around the wheels, and that each sensor receives data from three axes (X, Y, and Z), there may be a total of 12 coherences, but sensors and axes with optimal coherence may be different for each road.

The active noise control system may sort some data that has the most appropriate coherence and is meaningful to use to reduce the amount of computation and memory, and may not store all data for optimal efficiency.

In some embodiments, in the case of the first road 710, Y-axis and Z-axis values of the acceleration sensor #1 620 and X-axis and Y-axis values of the acceleration sensor #3 640 may be used as an input value of the acceleration sensor of active noise control, and the remaining data may not be used.

In some embodiments, in the case of the second road 720, X-axis and Y-axis values of the acceleration sensor #1 620, X-axis and Z-axis values of the acceleration sensor #2 630, and an X-axis value of the acceleration sensor #4 650 may be used as the input value of the acceleration sensor of active noise control, and the remaining data may not be used.

In some embodiments, in the case of the third road 730, X-axis and Z-axis values of the acceleration sensor #2 630 and X-axis and Z-axis values of the acceleration sensor #3 640 may be used as the input value of the acceleration sensor of active noise control, and the remaining data may not be used.

Figure 8:
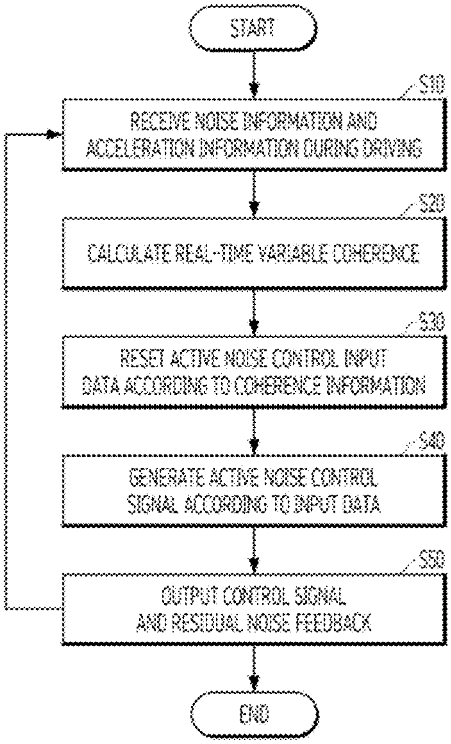
FIG. 8 is a diagram for explaining coherence in active noise control, according to an embodiment of the present disclosure.

FIG. 8 is a flowchart for explaining an active noise control method using real-time variable coherence, according to an embodiment of the present disclosure.

Referring to FIG. 8, the active noise control apparatus 2000 using real-time variable coherence may receive noise information and acceleration information during driving (S10).

After operation S20, the active noise control apparatus 2000 using real-time variable coherence may calculate real-time variable coherence (S20).

After operation S20, the active noise control apparatus 2000 using real-time variable coherence may reset input data for active noise control according to the calculated coherence information (S30).

After operation S30, the active noise control apparatus 2000 using real-time variable coherence may generate an active noise control signal according to the input data (S40)).

After operation S40, the active noise control apparatus 2000 using real-time variable coherence may output a control signal. Then, residual noise feedback may be performed (S50)).

In other words, the technical idea of the present disclosure may be applied to an entire autonomous vehicle or only to some components inside the autonomous vehicle. The scope of the present disclosure needs to be determined according to the claims.

According to another aspect of the present disclosure, there may be provided a code in which the above-described proposal or operation of the present disclosure is implemented, performed, or executed by a "computer" (a comprehensive concept including a system on chip (SoC) or microprocessor), or an application, a non-transitory computer-readable storage medium, or a computer program product, which may store or include the code, which may also fall within the scope of the present disclosure. For example, the above-described noise value collector, acceleration value collector, coherence calculator, control signal generator, and control signal output unit may be implemented by one or more processors or microprocessors. The one or more processors or microprocessors, when executing the code stored in the non-transitory computer-readable storage medium, may be configured to perform the above-described operations.

According to one of the embodiments of the present disclosure, active noise control performance may be improved only by improving algorithm logic without increasing additional costs other than installed sensors or systems.

It will be appreciated by persons skilled in the art that the effects that could be achieved with the present disclosure are not limited to what has been particularly described hereinabove and other advantages of the present disclosure will be more clearly understood from the above detailed description.

The detailed description of the exemplary embodiments of the present disclosure is given to enable those skilled in the art to realize and implement the present disclosure. While the present disclosure has been described referring to the exemplary embodiments of the present disclosure, those skilled in the art will appreciate that many modifications and changes may be made to the present disclosure without departing from the spirit and essential characteristics of the present disclosure. For example, the structures of the above-described embodiments of the present disclosure may be used in combination.

Therefore, the present disclosure intends not to limit the embodiments disclosed herein but to give a broadest range matching the principles and new features disclosed herein.

What is claimed is:

1. An active noise control method using real-time variable coherence, the method comprising:

receiving noise information from a microphone sensor;

receiving acceleration information from an acceleration sensor;

calculating real-time variable coherence by comparing the received noise information with the received acceleration information;

resetting input data of an active noise control region for a speaker according to the calculated coherence information;

generating an active noise control signal based on the reset input data; and outputting the generated active noise control signal to control output of the speaker to actively reduce noise, wherein the calculating of real-time variable coherence by comparing the received noise information with the received acceleration information includes:

creating coherence pairs by using axes of all acceleration sensors for all microphone sensors installed in a vehicle; and calculating, as each coherence value, a correlation between noise information and acceleration information corresponding to a respective one of the coherence pairs, and the resetting of input data of an active noise control region according to the calculated coherence information includes:

determining an axis of an acceleration sensor with a highest correlation based on the calculated coherence value; and selecting the axis of the determined acceleration sensor as active noise control input data.

2. The method of claim 1, wherein the determining of an axis of an acceleration sensor with a highest correlation includes determining an axis of an acceleration sensor corresponding to a coherence value having a highest value in a certain frequency domain per unit time from among the calculated coherence values.

3. The method of claim 1, wherein the selecting of the axis of the determined acceleration sensor as active noise control input data includes selecting an acceleration sensor and an axis having a preset optimal coherence corresponding to a road on which the vehicle drives.

4. An active noise control apparatus using real-time variable coherence, the apparatus comprising:

a noise value collector configured to receive noise information from a microphone sensor;

an acceleration value collector configured to receive acceleration information from an acceleration sensor;

a coherence calculator configured to calculate real-time variable coherence by comparing the received noise information with the received acceleration information;

a control signal generator configured to reset input data of an active noise control region for a speaker according to the calculated coherence information and generate an active noise control signal based on the reset input data; and a control signal output unit configured to output the generated active noise control signal to control output of the speaker to actively reduce noise, wherein the coherence calculator is configured to create coherence pairs by using axes of all acceleration sensors for all microphone sensors installed in a vehicle and calculate, as each coherence value, a correlation between noise information and acceleration information corresponding to a respective one of the coherence pairs, and the control signal generator is configured to determine an axis of an acceleration sensor with a highest correlation based on the calculated coherence value and select the axis of the determined acceleration sensor as active noise control input data.

5. The apparatus of claim 4, wherein the control signal generator is configured to determine an axis of an acceleration sensor corresponding to a coherence value having a highest value in a certain frequency domain per unit time from among the calculated coherence values.

6. The apparatus of claim 4, wherein the control signal generator is configured to select an acceleration sensor and an axis having a preset optimal coherence corresponding to a road on which the vehicle drives.

* * * * *